(12) United States Patent
Chen

(10) Patent No.: US 7,087,138 B2
(45) Date of Patent: Aug. 8, 2006

(54) MACHINE FOR MAKING PADS HAVING CHAMBERS

(76) Inventor: Meng Pei Chen, P.O. Box 63-298, Taichung (TW) 406

( * ) Notice: Subject to any disclaimer, the term of this patent is extended or adjusted under 35 U.S.C. 154(b) by 94 days.

(21) Appl. No.: 10/768,362

(22) Filed: Jan. 28, 2004

(65) Prior Publication Data
US 2005/0161165 A1 Jul. 28, 2005

(51) Int. Cl.
*B30B 15/00* (2006.01)
(52) U.S. Cl. .................... 156/583.1; 156/580
(58) Field of Classification Search ............. 156/499, 156/538, 439, 556, 580, 581, 583.1, 228, 156/285, 539; 100/315
See application file for complete search history.

(56) References Cited

U.S. PATENT DOCUMENTS

| | | | | |
|---|---|---|---|---|
| 4,792,373 A | * | 12/1988 | Hsei et al. | 156/497 |
| 4,927,479 A | * | 5/1990 | Bock | 156/228 |
| 5,997,688 A | * | 12/1999 | Wawrzyniak | 156/583.1 |
| 6,119,752 A | * | 9/2000 | Zollinger et al. | 156/499 |
| 6,328,842 B1 | * | 12/2001 | Coninck et al. | 156/304.2 |

* cited by examiner

*Primary Examiner*—James Sells

(57) ABSTRACT

A machine includes a lower and an upper molds to support and to move two pad members toward and away from each other. A heating device includes two heating members for heating the pad members, and a sending device may send the heating members toward and away from the pad members to locate the heating members between the pad members and to allow the pad members to be heated by the heating members, and to disengage the heating members away from the pad members after the pad members have been heated by the heating members. Each of the pad members includes one or more hollow chambers for cushioning purposes.

6 Claims, 11 Drawing Sheets

MACHINE FOR MAKING PADS HAVING CHAMBERS

BACKGROUND OF THE INVENTION

1. Field of the Invention

The present invention relates to a machine, and more particularly to a machine for quickly making pads having cavities or hollow chambers formed therein.

2. Description of the Prior Art

Carious kinds of typical pads, such as cushioning pads have been developed and provided for making such as shoe soles, seat cushions, chair arms, or the like, and comprise a pad body having one or more cavities or hollow chambers formed therein, to provide suitable cushioning resilience.

However, normally, the pads include a single layer of the pad body having the cavities or hollow chambers formed therein, and are directly formed by such as molding or mold injecting processes. The typical pads do not include two layers of cushioning members to be secured together, and no machines have been developed or provided to secure two layers of cushioning members together.

The present invention has arisen to mitigate and/or obviate the afore-described disadvantages of the conventional machines for making pads.

SUMMARY OF THE INVENTION

The primary objective of the present invention is to provide a machine for quickly making pads having cavities or hollow chambers formed therein.

In accordance with one aspect of the invention, there is provided a machine comprising a base, a lower mold disposed on the base to receive and support a first pad member thereon, an upper mold disposed above the lower mold to receive and support a second pad member thereon, a moving device for moving the upper mold toward and away from the lower mold, to move the first and the second pad members toward and away from each other, a heating device including two heating members for heating the first and the second pad members respectively, a sending device for sending the heating members of the heating device toward and away from the first and the second pad members, and to locate the heating members between the first and the second pad members and to allow the first and the second pad members to be heated by the heating members respectively, and to disengage the heating members away from the first and the second pad members after the first and the second pad members have been heated by the heating members, and a loading device for loading the first and the second pad members toward and away from the upper mold and the lower mold.

The base includes a stand provided thereon to support the upper mold, the moving device includes an actuator attached to the stand and coupled to the upper mold, to adjust and move the upper mold toward and away from the lower mold. The base includes a seat provided thereon, a follower slidably attached to the seat to support the stand. The seat includes an adjusting device attached to the seat and coupled to the follower, to adjust and move the follower relative to the seat.

The follower includes an adjusting device attached thereto and coupled to the stand, to adjust and move the stand relative to the follower. The base includes an adjusting device attached thereto and coupled to the stand, to adjust and move the stand relative to the base.

The base may further include a vacuuming device for vacuuming the second pad member to the upper mold. A smoke exhauster device may further be provided and attached to the base for smoke exhausting purposes.

The sending device includes an actuator disposed on the base and coupled to the heating device, to the heating device toward and away from the first and the second pad members. The heating device includes a board slidably attached on the base and coupled to the actuator.

The heating device includes a block slidably attached on the board, and an adjusting device attached to the board and coupled to the block, to adjust and move the block relative to the board. The heating device includes a lever slidably attached to the block to support the heating members. The heating members are attached on top and bottom of the lever respectively, to heat the first and the second pad members respectively.

The heating device includes an adjusting device attached to the block and coupled to the lever, to adjust and move the lever relative to the block. A shielding device may further be provided for shielding the heating members of the heating device. The shielding device includes a protecting device disposed above the heating members, to shield the heating members, and to prevent operators from being heated or hurt by the heating members inadvertently.

The base includes an adjusting device attached thereto and coupled to the protecting device, to adjust and move the protecting device up and down relative to the base and the heating members. It is preferable that each of the pad members includes one or more hollow chambers formed therein for cushioning purposes.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
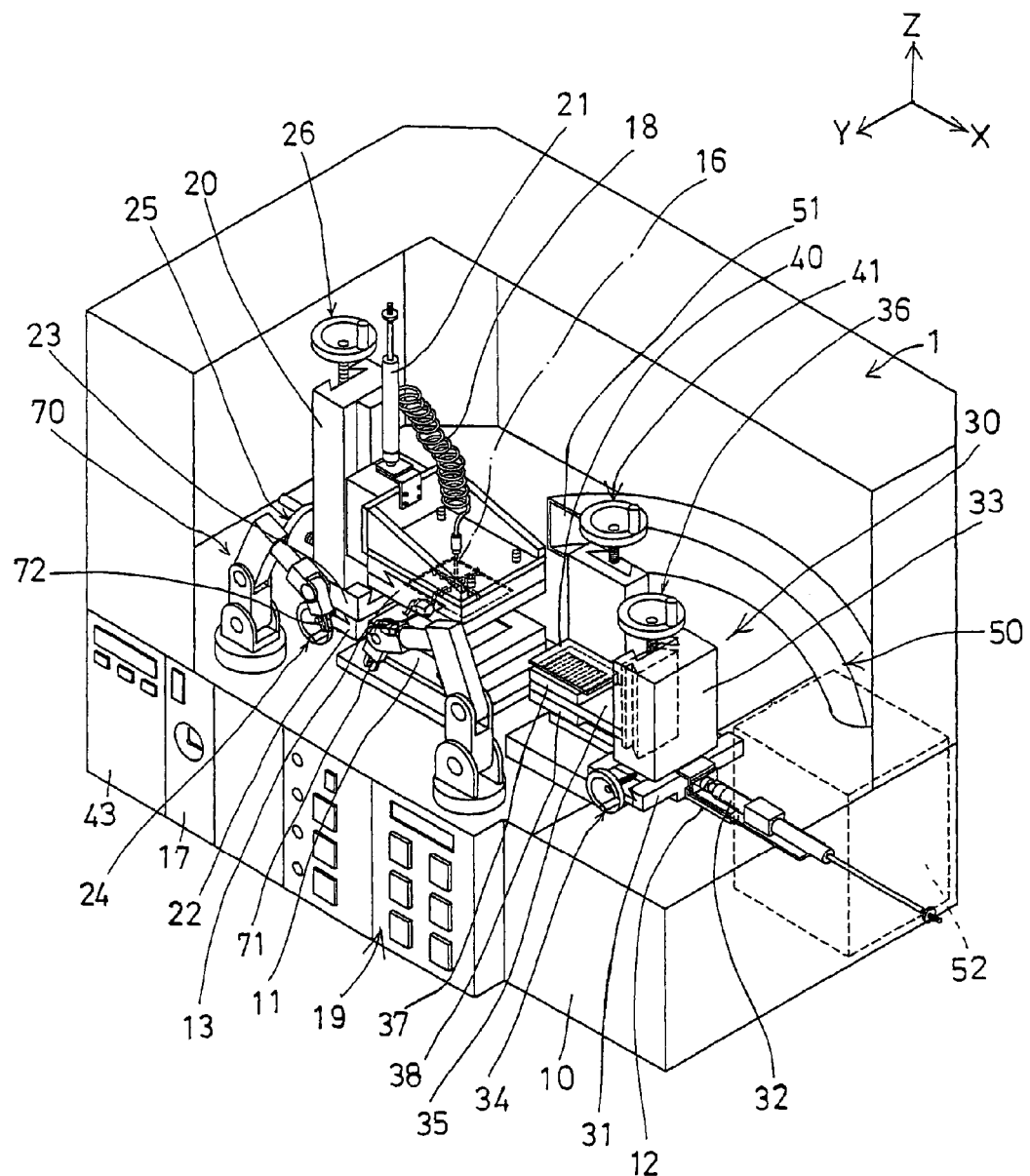
FIG. 1 is a perspective view of a machine in accordance with the present invention.

Referring to the drawings, and initially to FIGS. 1–6, a machine 1 in accordance with the present invention is illustrated and comprises a base 10 having a lower mold 11 disposed thereon to support a prototype or pad member 90 thereon, and an upper mold 13 disposed above the lower mold 11 to support another prototype or pad member 91 thereon and to be moved toward or away from the lower mold 11.

Figures 8, 9:
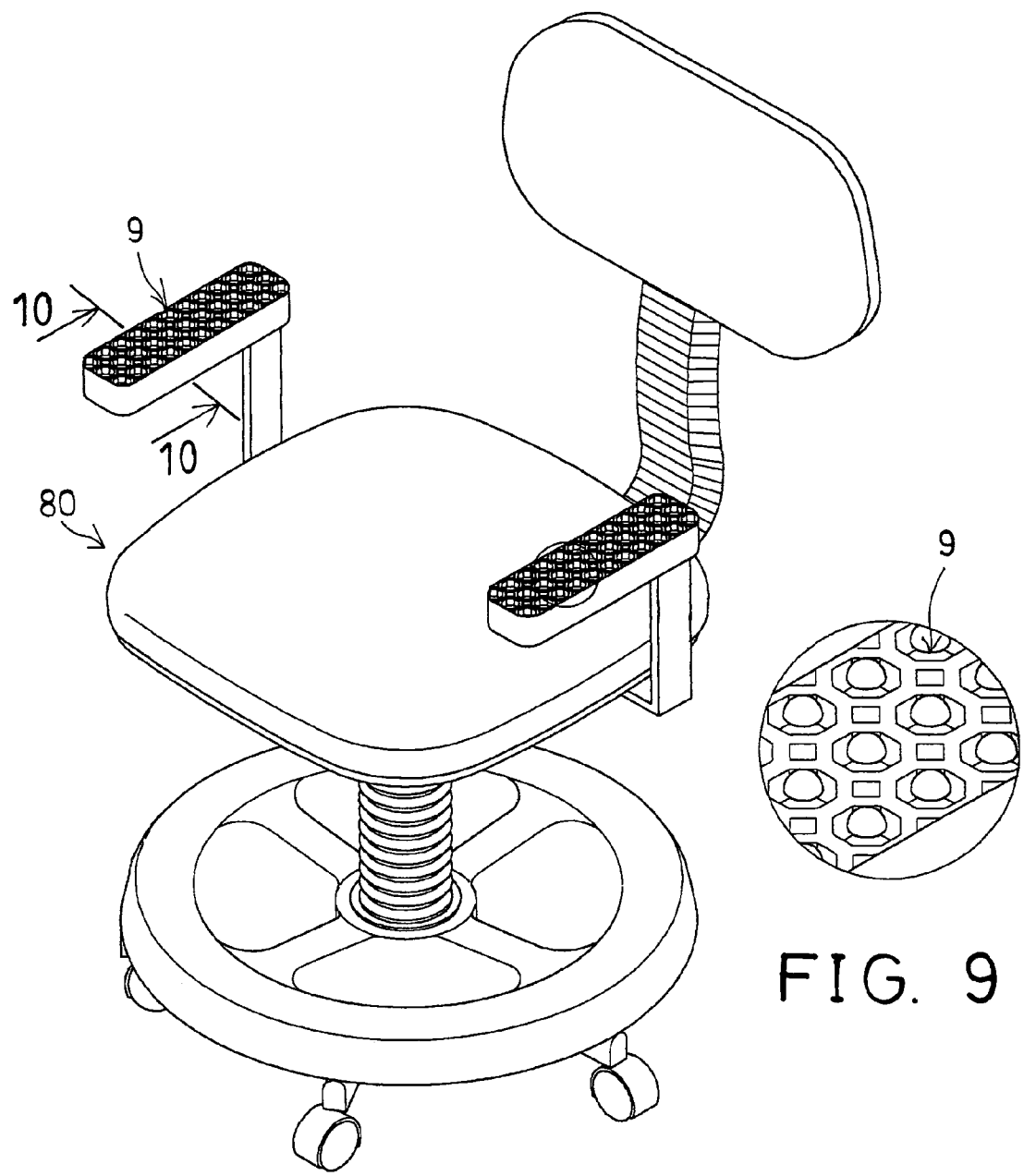
FIG. 8 is a perspective view of a chair having an arm to be made by the machine.
FIG. 9 is an enlarged partial perspective view of the arm of the chair.
Figure 10:
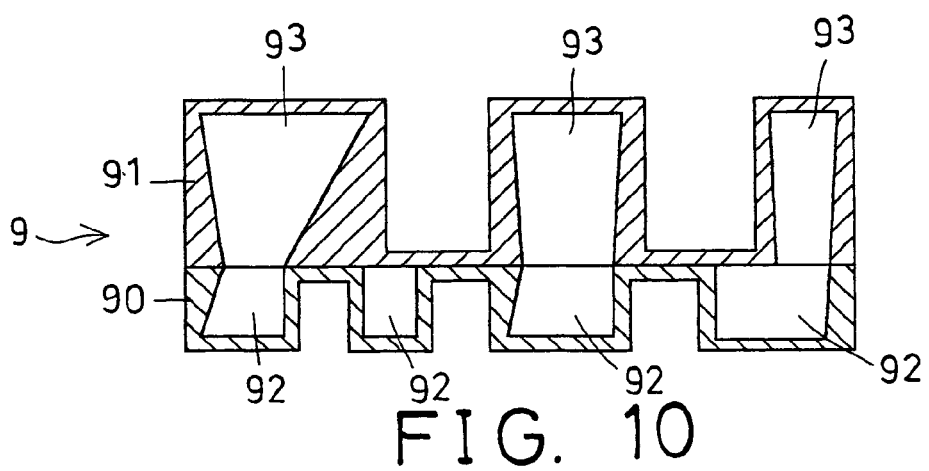
FIG. 10 is a cross sectional view taken along lines 10—10 of FIG. 8.
Figure 13:
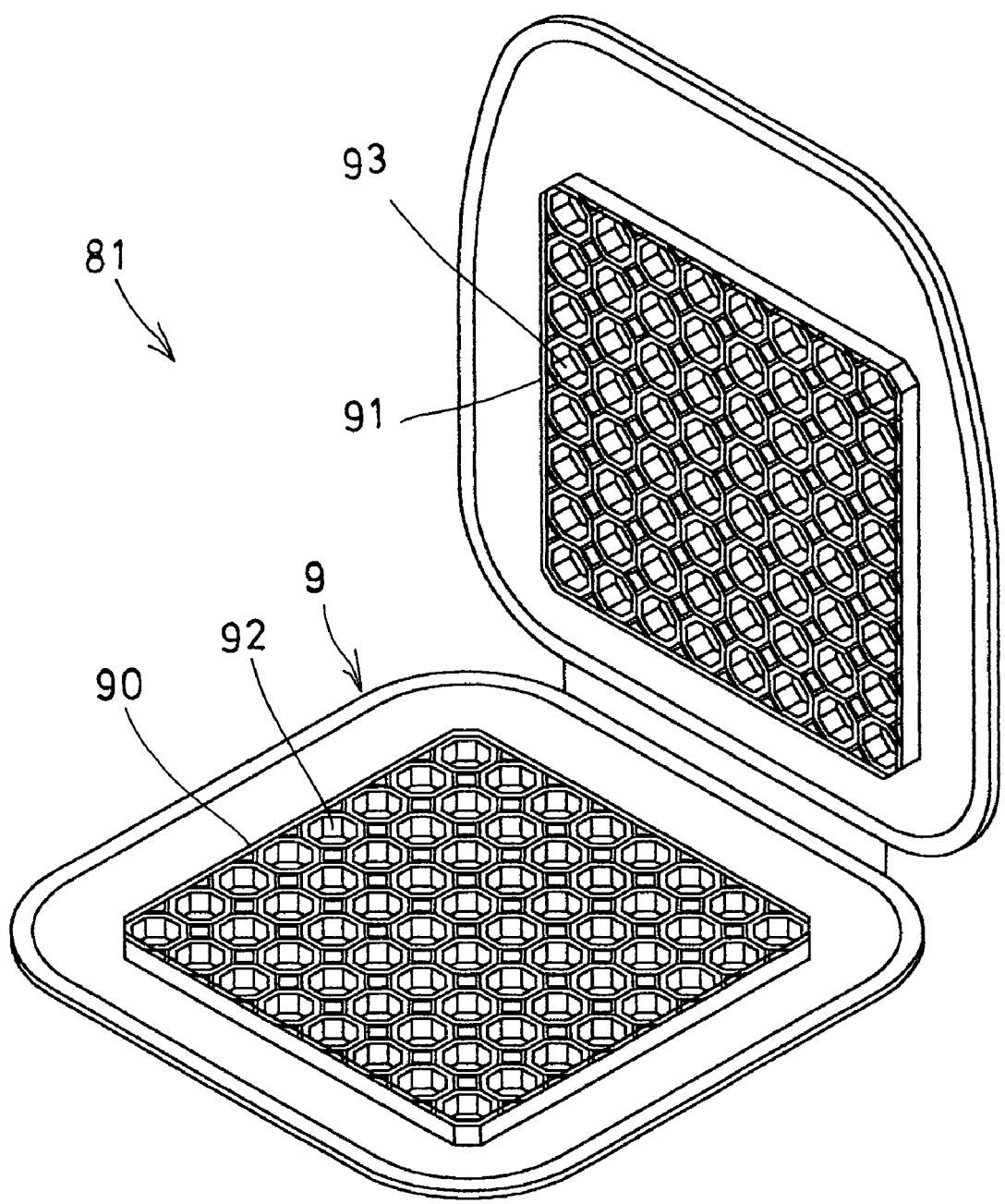
FIG. 13 is a perspective view showing a seat cushion to be made by the machine.

As shown in FIGS. 8–10, illustrated is a pad 9 to be formed by the pad members 90, 91 and to be made by the machine 1, for making such as the arm of the chair 80 (FIG. 8), or the seat cushion 81 (FIG. 13), or the shoe sole 83 (FIG. 14), or the like. Each of the pad members 90, 91 may include one or more cavities or hollow chambers 92, 93 formed therein for increasing the resilience of the pad 9.

Figure 11:
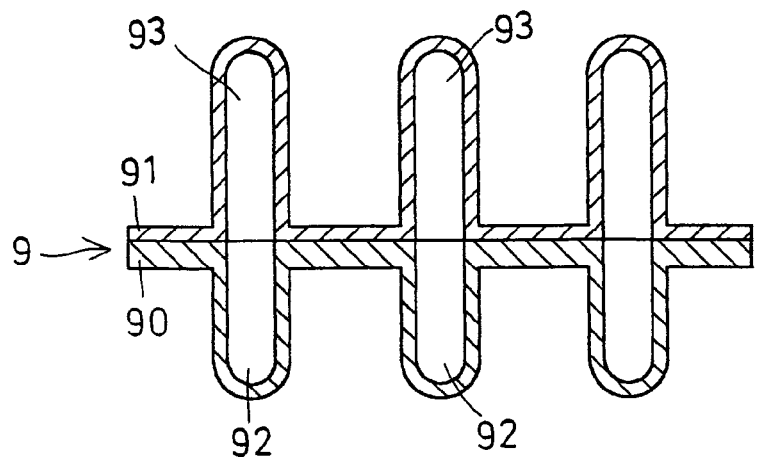
FIGS. 11, 12 are cross sectional views similar to FIG. 10, illustrating the other embodiments of the pad to be made by the machine.
Figure 12:
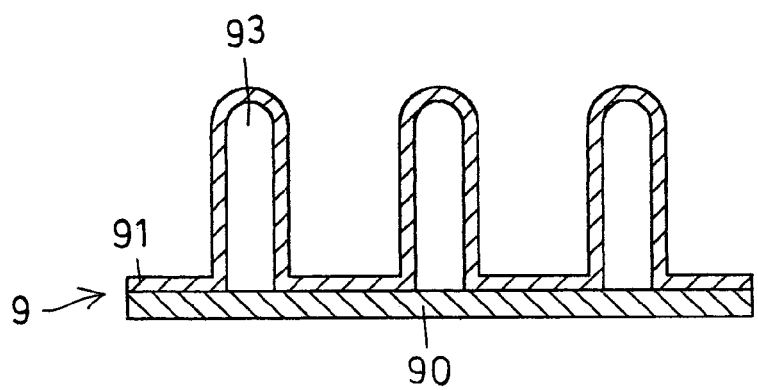
Figure 14:
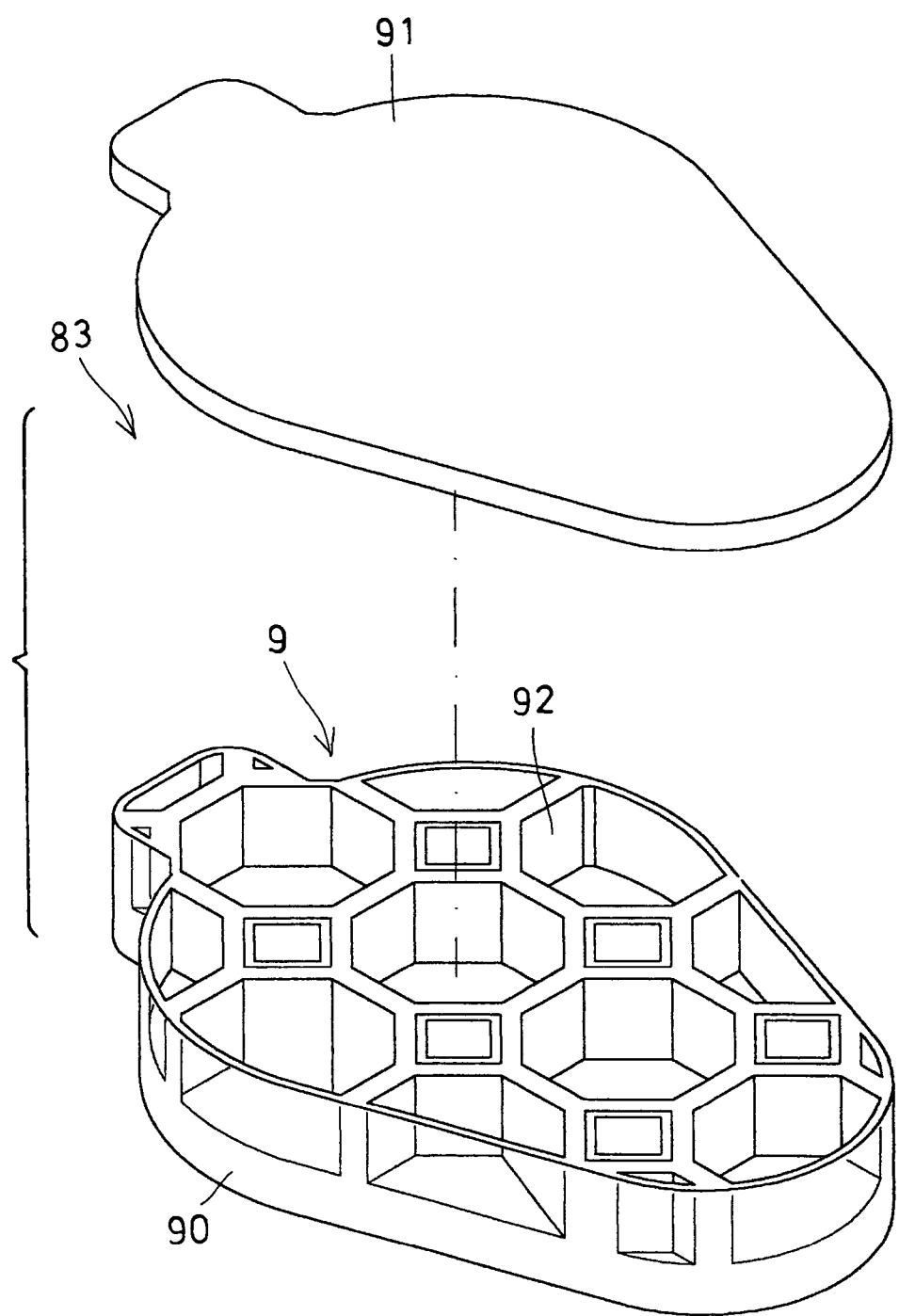
FIG. 14 is a partial exploded view of shoe sole to be made by the machine.

For example, as shown in FIG. 10, each of the pad members 90, 91 may include one or more cavities or hollow chambers 92, 93 formed therein, in which some of the hollow chambers 92, 93 are aligned with each other (FIGS. 11. 13) and/or communicated with each other, or offset from each other. As shown in FIGS. 12 and 14, one of the pad members 90 may include no cavities or hollow chambers 92 formed therein.

The machine in accordance with the present invention is provided for making the pads 9 having two pad members 90, 91 to be secured together by the machine 1. The pad members 90, 91 may be preformed by such as the typical or usual molding or mold injection processes, and may include none or one or more cavities or hollow chambers 92, 93 formed therein.

For example, the upper mold 13 may include a mold cavity 14 formed therein to receive the pad member 91 therein, and may include one or more air passages 16 formed therein and communicating with the mold cavity 14 thereof and coupled to a vacuum device 17 with one or more hoses 18, in order to vacuum or to draw and retain the pad member 91 to the upper mold 13. The machine 1 includes a control panel 19 provided on the base 10 for controlling or operating the machine 1.

The upper mold 13 may be slidably or adjustably attached to a stand 20 with a cylinder or actuator 21, which may move the upper mold 13 downwardly toward or upwardly away from the lower mold 11. A seat 22 is provided on the base 10, a follower 23 is slidably attached to the seat 22 and coupled to the seat 22 with an adjusting device 24 which may move the follower 23 along a longitudinal axis of the base 10, such as a Y-axis of the base 10 (FIG. 1).

The stand 20 is slidably attached to the follower 23 and coupled to the follower 23 with another adjusting device 25 which may move the stand 20 along a lateral axis of the base 10, such as an X-axis of the base 10 (FIG. 1). A further adjusting device 26 may couple the stand 20 and the follower 23 and the seat 22 to the base 10, to move the stand 20 along a vertical axis of the base 10, such as a Z-axis of the base 10 (FIG. 1).

Accordingly, the upper mold 13 may be precisely moved and located above the lower mold 11 by the adjusting devices 24, 25, 26, and may be moved toward and away from the lower mold 11 by the actuator 21, in order to move the pad members 90, 91 toward each other (FIG. 5), for allowing the pad members 90, 91 to be suitably secured together.

A heating device 30 is provided to heat the pad members 90, 91, and to slightly melt the pad members 90, 91, and thus to allow the pad members 90, 91 to be suitably adhered together by the melted materials of the pad members 90, 91 respectively. The heating device 30 includes a board 31 slidably attached on a track 12 of the base 10, and slidably or adjustably attached to the base 10 with a cylinder or actuator 32 which may move or actuate the board 31 of the heating device 30 toward and away from the molds 11, 13 and the pad members 90, 91, or along the X-axis of the base 10.

A block 33 is slidably attached on the board 31, and slidably or adjustably coupled to the board 31 with an adjusting device 34 which may move the block 33 along the Y-axis of the base 10, or laterally relative to the base 10 and the molds 11, 13 and the pad members 90, 91. A lever 35 is slidably or adjustably coupled to the block 33 with another adjusting device 36 which may move the lever 35 along the Z-axis of the base 10, or up and down relative to the base 10 and the molds 11, 13 and the pad members 90, 91.

Two heating members 37, 38 are attached to the lever 35 and disposed on top of and on the bottom of the lever 35 respectively, and may be moved toward the space defined between the molds 11, 13 and the pad members 90, 91 (FIG. 4) by the actuator 32, for suitably heating the pad members 90, 91 respectively. The pad members 90, 91 may be made of plastic, rubber or other synthetic materials and may be suitably melted.

The heating members 37, 38 of the heating device 30 may then be moved away from the molds 11, 13 and the pad members 90, 91 (FIG. 5) by the actuator 32, after the pad members 90, 91 have been heated by the heating members 37, 38 of the heating device 30. The pad member 91 may then be moved downwardly toward the pad member 90 to allow the heated or melted pad members 90, 91 to be suitably adhered and secured together.

A shielding or protecting device 40 may be provided and disposed above the heating members 37, 38 of the heating device 30, to shield the heating members 37, 38 of the heating device 30, and to prevent the users or operators from being heated or hurt by the heating members 37, 38 of the heating device 30 inadvertently. The shielding or protecting device 40 may be slidably or adjustably attached to the base 10 with a cylinder or actuator 41 which may move the shielding or protecting device 40 toward (FIGS. 1–3 and 5–6) and away from the heating members 37, 38 of the heating device 30 (FIG. 4).

A fan or cooling device 43 may further be provided and coupled to the molds 11, 13, to suitably cool the molds 11, 13 and thus the pad members 90, 91, when required, in order to prevent the pad members 90, 91 from being over-heated. The members 37, 38 of the heating device 30 may be provided or arranged to heat the pad members 90, 91 to different or various temperatures which may be controlled or determined by the control panel 19.

Figure 7:
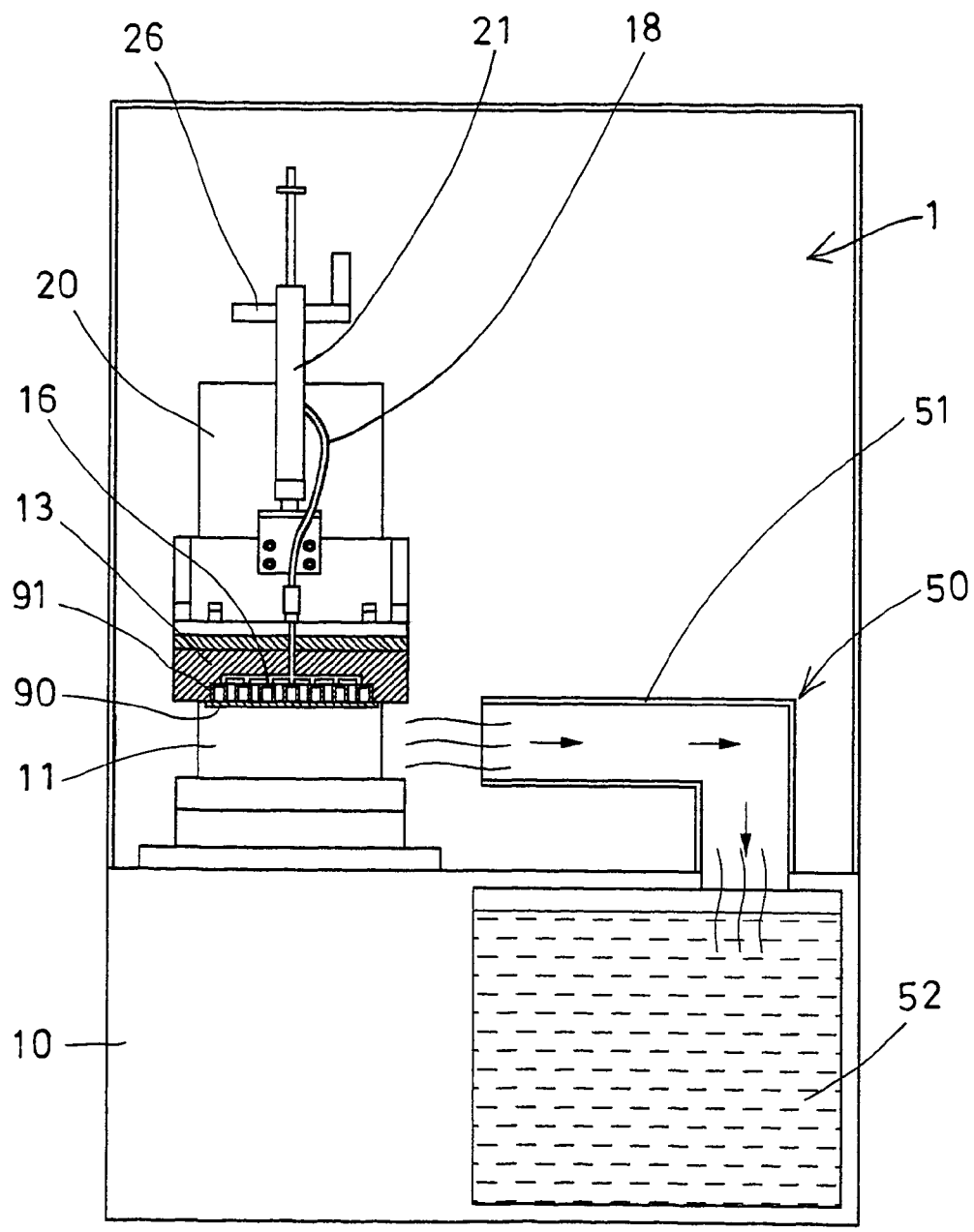
FIG. 7 is an end plan schematic view illustrating the operation of the machine.

As shown in FIGS. 1 and 7, a smoke exhauster device 50 may further be provided, and includes a duct 71 for directing toward the molds 11, 13 and the pad members 90, 91. The smoke exhauster device 50 may draw the smoke or gas, particularly the toxic smoke or air generated around the molds 11, 13 and the pad members 90, 91, toward or through a filter device 52 which may filter the smoke or gas into filtered or clean air.

Figure 2:
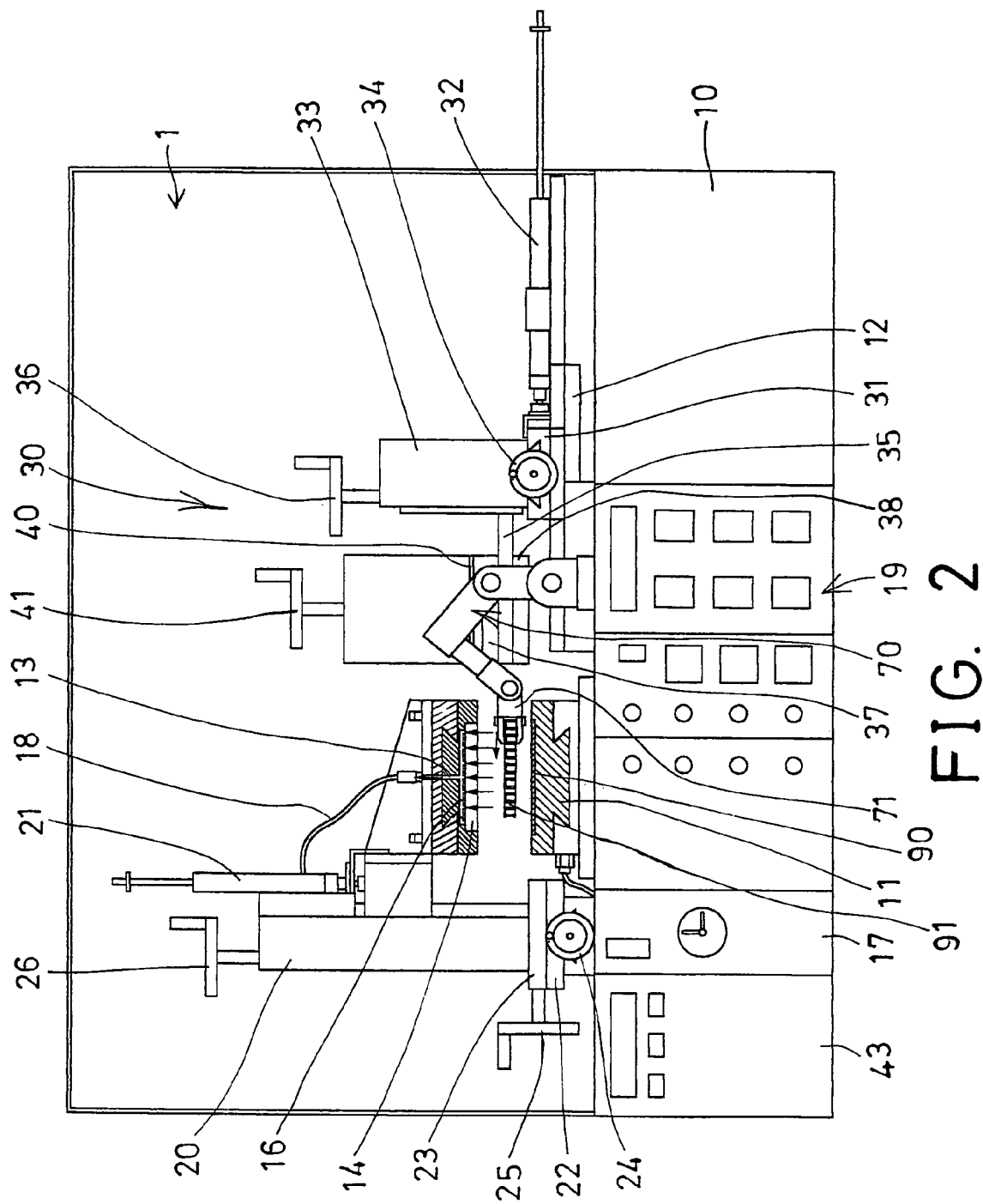
FIG. 2 is a front plan schematic view of the machine.
Figure 3:
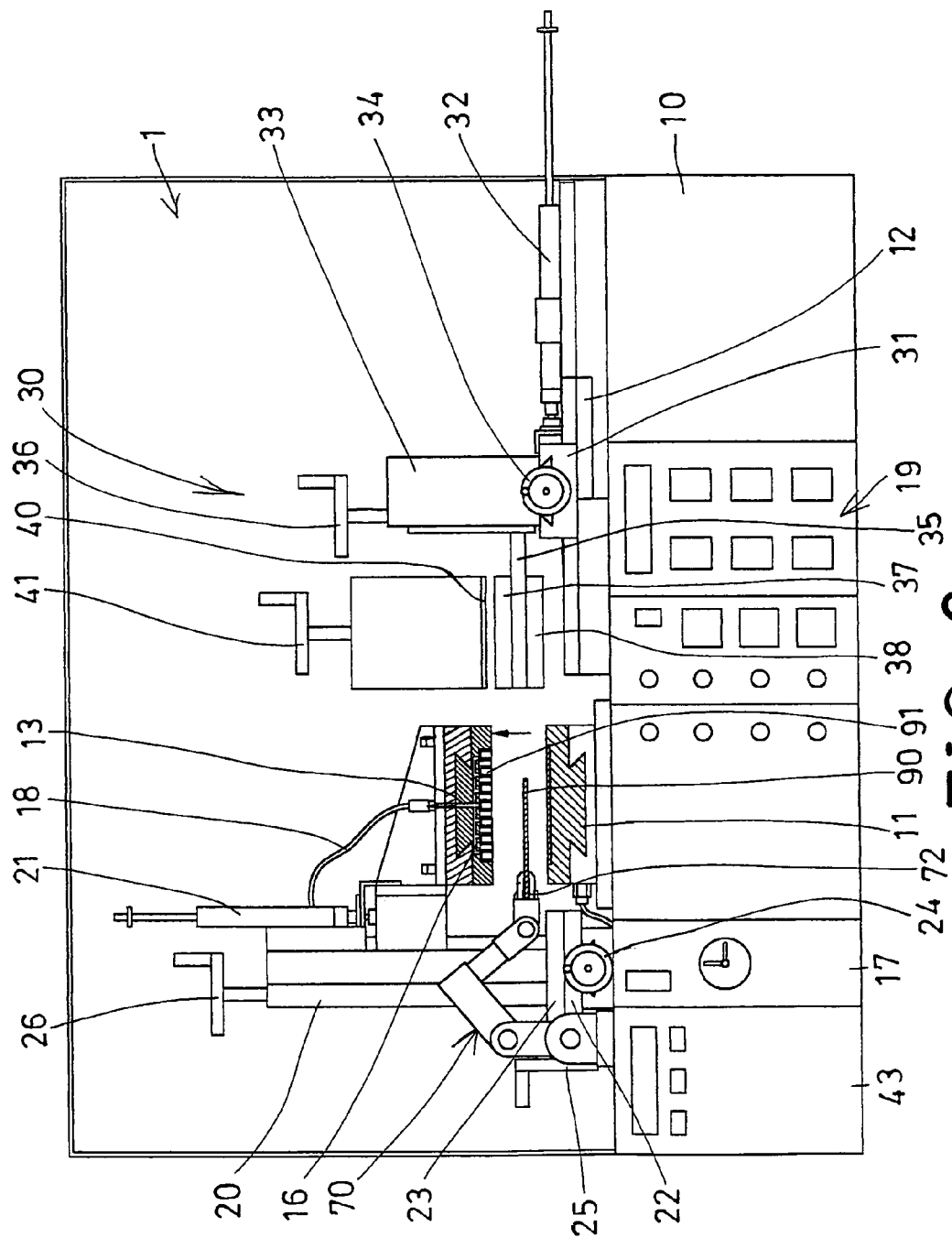
FIGS. 3, 4, 5, 6 are front plan schematic views similar to FIG. 2, illustrating the operation of the machine.
Figure 4:
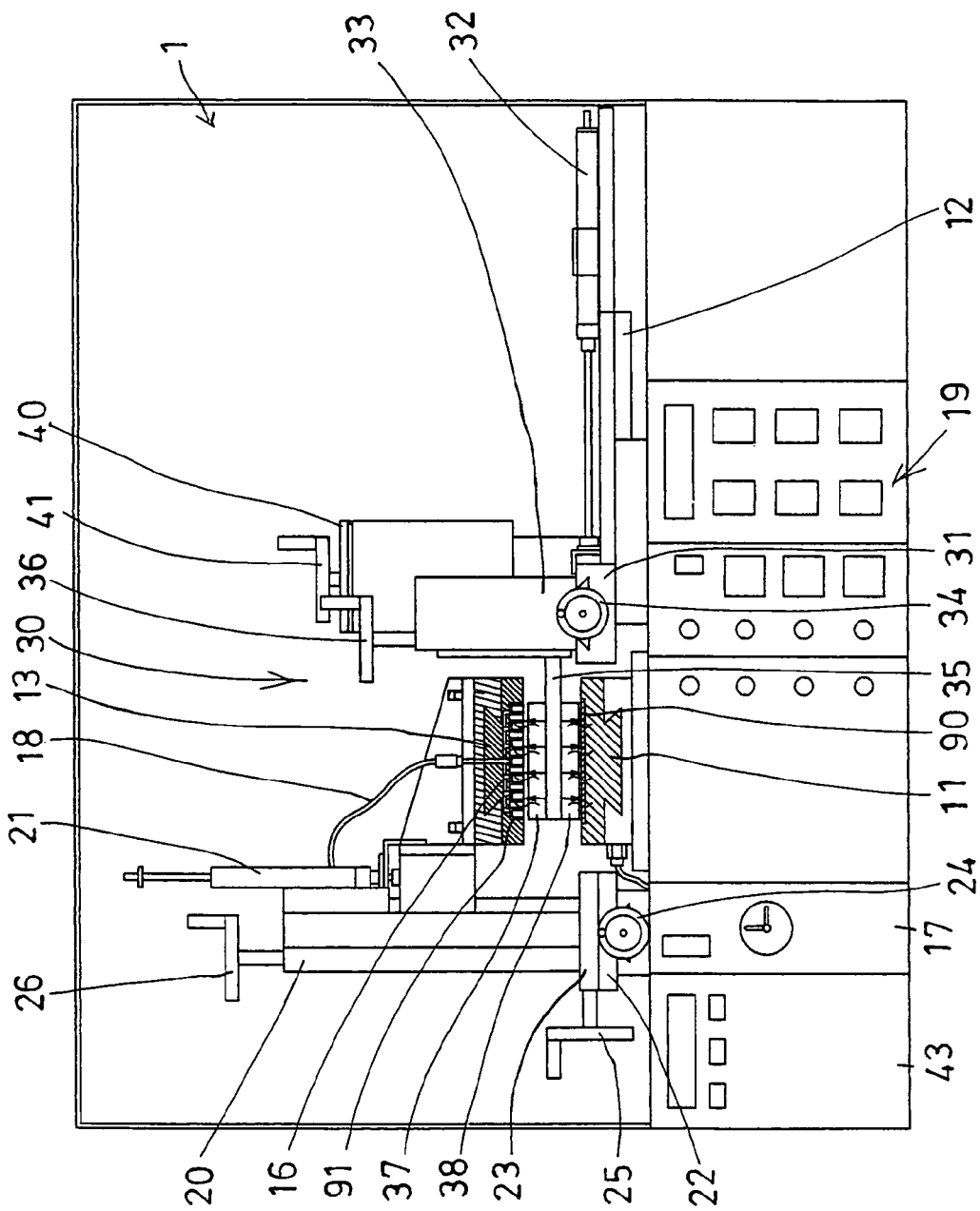
Figure 5:
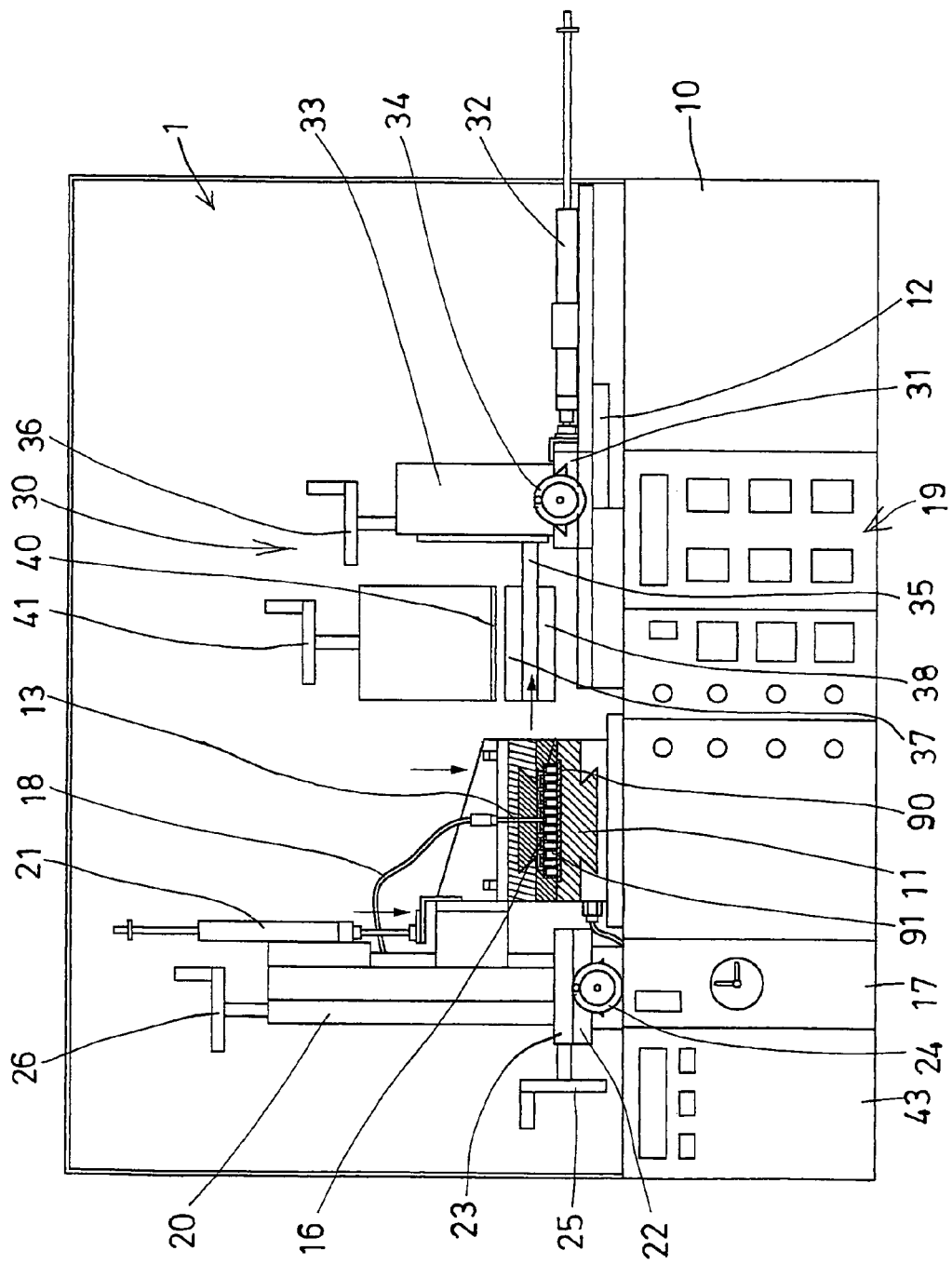
Figure 6:
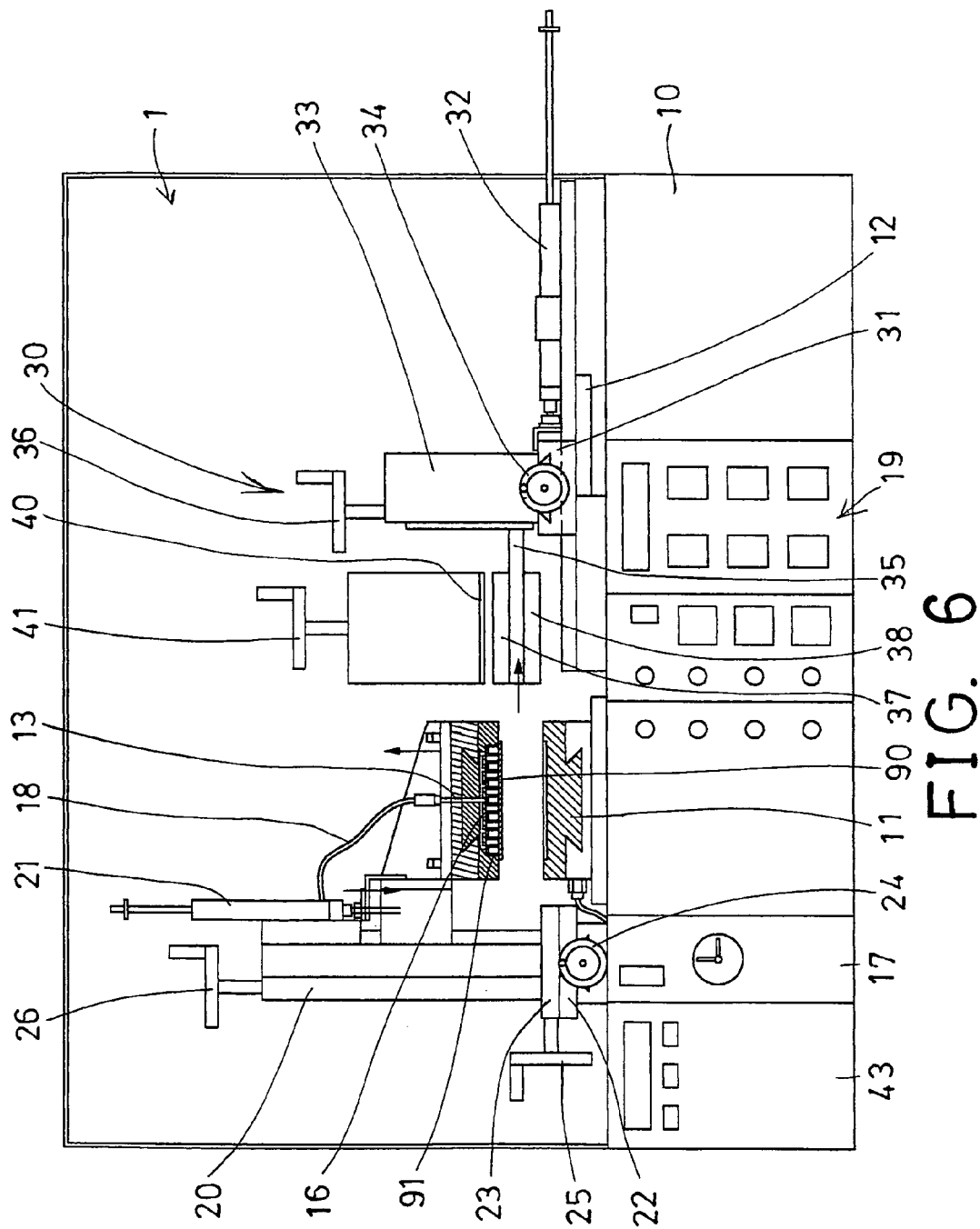

As shown in FIGS. 1–3, a feeding or loading device 70 may further be provided, and includes an arm or robot 71 to send or feed the pad member 91 to the upper mold 13 (FIG. 2), and another arm or robot 72 to send or feed the other pad member 90 to the lower mold 11 (FIG. 3). Either of the robots 71, 72 may be used to fetch and move the pad 9 out of the molds 11, 13 after the pad members 90, 91 have been secured together.

It is to be noted that the typical pad members 90, 91 may be formed by such as the typical or usual molding or mold injection processes, and may include cavities or hollow chambers formed therein. However, none of the typical pad 9 may include two pad members 90, 91 to be secured together with the present machine.

Accordingly, the machine in accordance with the present invention may be provided for quickly making pads having cavities or hollow chambers formed therein.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A machine comprising:

a base including a stand provided thereon and including a seat provided thereon, a follower slidably attached to said seat to support said stand, a first adjusting device attached to said seat and coupled to said follower, to adjust and move said follower relative to said seat, said follower including a second adjusting device attached thereto and coupled to said stand, to adjust and move said stand relative to said follower, a lower mold disposed on said base to receive and support a first pad member thereon, an upper mold supported on said stand of said base and disposed above said lower mold to receive and support a second pad member thereon, said upper mold including a mold cavity formed therein to receive said second pad member therein, and including at least one air passage formed therein and communicating with said mold cavity thereof, a vacuum device coupled to said at least one air passage of said upper mold, in order to vacuum and to draw and retain said second pad member to said upper mold, means for moving said upper mold toward and away from said lower mold, to move said first and said second pad members toward and away from each other, said moving means including a first actuator attached to said stand and coupled to said upper mold, to adjust and move said upper mold toward and away from said lower mold, a heating device including two heating members for heating said first and said second pad members respectively, said heating device including a board slidably attached on said base and including a block slidably attached on said board, a third adjusting device attached to said board and coupled to said block, to adjust and move said block relative to said board, a lever slidably attached to said block of said heating device to support said heating members, said heating members being attached on top and bottom of said lever respectively, to heat said first and said second pad members respectively, a fourth adjusting device attached to said block and coupled to said lever, to adjust and move said lever relative to said block, a smoke exhauster device attached to said base for smoke exhausting purposes, means for sending said heating members of said heating device toward and away from said first and said second pad members, and to locate said heating members between said first and said second pad members and to allow said first and said second pad members to be heated by said heating members respectively, and to disengage said heating members away from said first and said second pad members after said first and said second pad members have been heated by said heating members, and said sending means including a second actuator disposed on said base and coupled to said board of said heating device, to adjust and to move said heating device toward and away from said first and said second pad members, means for loading said first and said second pad members toward and away from said upper mold and said lower mold.

2. The machine as claimed in claim 1 further comprising means for shielding said heating members of said heating device.

3. The machine as claimed in claim 2, wherein said shielding means includes a protecting device disposed above said heating members, to shield said heating members, and to prevent operators from being heated or hurt by said heating members inadvertently.

4. The machine as claimed in claim 3, wherein said base includes an adjusting device attached thereto and coupled to said protecting device, to adjust and move said protecting device up and down relative to said base and said heating members.

5. The machine as claimed in claim 1, wherein said first pad member includes at least one hollow chamber formed therein.

6. The machine as claimed in claim 1, wherein said second pad member includes at least one hollow chamber formed therein.

* * * * *